United States Patent [19]

Ballendux

[11] 4,271,942  
[45] Jun. 9, 1981

[54] TWO-SPEED POWER TAKE-OFF

[75] Inventor: Gerardus M. Ballendux, Waukesha, Wis.

[73] Assignee: Allis-Chalmers Corporation, Milwaukee, Wis.

[21] Appl. No.: 947,872

[22] Filed: Oct. 2, 1978

[51] Int. Cl.³ .............................................. F16D 21/04
[52] U.S. Cl. ................................ 192/48.91; 74/15.4; 74/372; 192/67 R; 192/93 C; 192/96
[58] Field of Search ................... 192/96, 48.91, 93 C, 192/67 R; 74/15.4, 371, 372

[56] References Cited

U.S. PATENT DOCUMENTS

| | | | |
|---|---|---|---|
| 1,015,254 | 1/1912 | Whisler | 192/96 X |
| 1,691,346 | 11/1928 | Gorbutt | 74/15.4 X |
| 1,704,433 | 3/1929 | Harris | 74/372 X |
| 2,032,735 | 3/1936 | Blanchard et al. | 192/93 C X |
| 2,054,574 | 9/1936 | Tyler | 192/93 C X |
| 2,611,464 | 9/1952 | Rabe | 192/96 X |
| 2,968,188 | 1/1961 | Du Shane et al. | 192/96 X |
| 3,352,165 | 11/1967 | Lee | 74/15.4 |
| 3,464,277 | 9/1969 | Longshore | 74/15.4 |
| 3,830,111 | 8/1974 | Travaglio | 74/15.4 |
| 4,141,424 | 2/1979 | Murayama et al. | 74/15.4 X |

FOREIGN PATENT DOCUMENTS

| | | | |
|---|---|---|---|
| 885172 | 9/1943 | France | 74/372 |
| 1065962 | 6/1954 | France | 192/96 |

Primary Examiner—Rodney H. Bonck  
Attorney, Agent, or Firm—Arthur L. Nelson

[57] ABSTRACT

A two-speed power take-off drive having interchangeable output shafts for selectively reciprocating a cammed shaft for biasing elements shifting a clutch collar for the two-speed operation.

12 Claims, 5 Drawing Figures

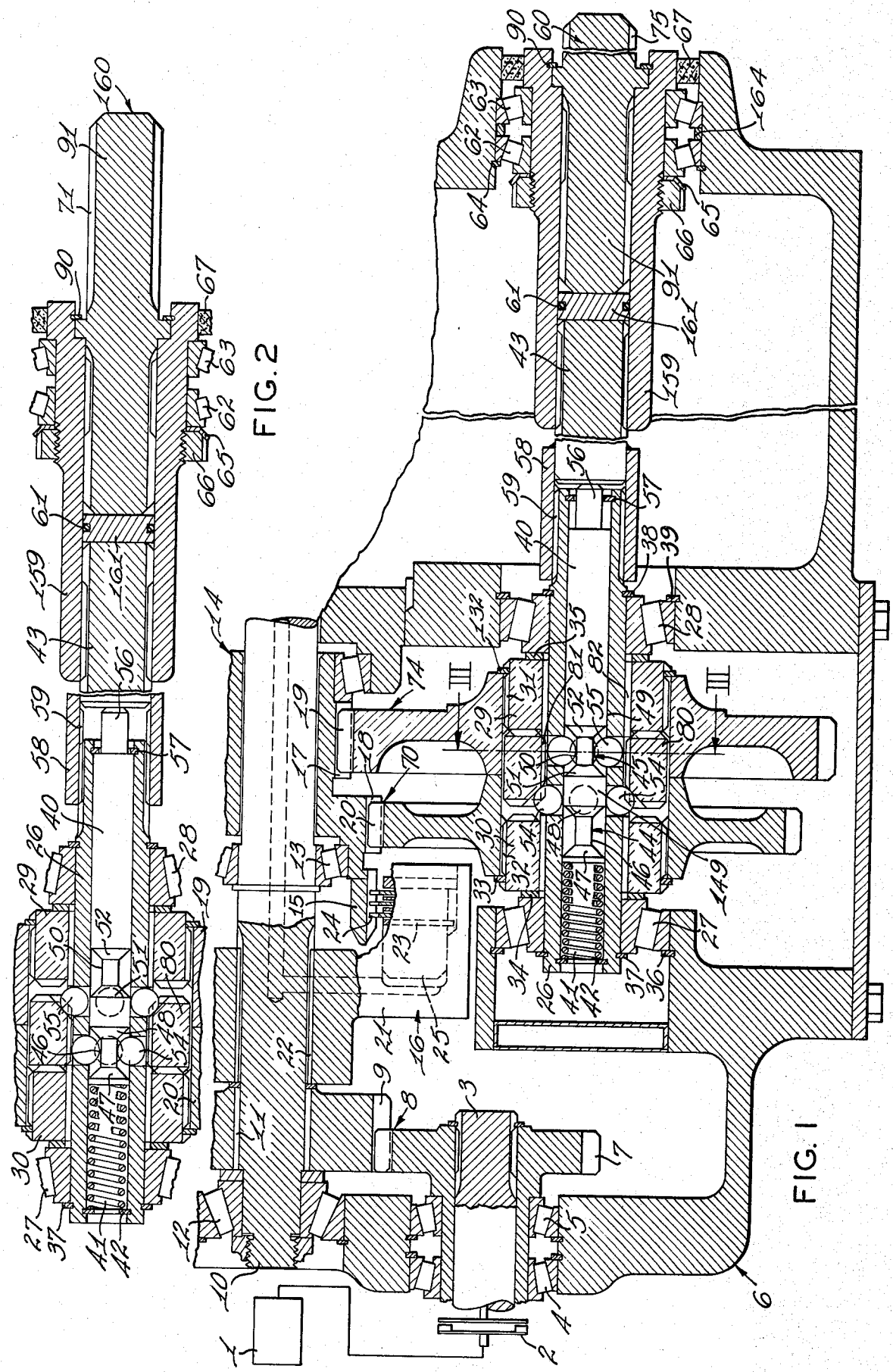

TWO-SPEED POWER TAKE-OFF

This invention relates to a power take-off mechanism and more particularly to a two-speed drive power take-off assembly having an interchangeable output shaft for 540 rpm and 1000 rpm output. Interchanging the output shaft selectively and alternatively reciprocates a cammed shaft for biasing shifting elements for shifting a clutch collar for the selected two-speed operation.

Industrial and farm tractors are fitted with power take-off shafts to drive implements and machinery at selected speeds of either 540 rpm or 1000 rpm. Since the output from the tractor is standardized at 540 rpm or 1000 rpm, a spline on the power take-off shaft must be selectively designed for the speed of the shaft to avoid connecting machinery and implements for operation at the wrong speed. A six spline take-off connection is provided for the 540 rpm while a 21-toothed spline connection is provided for the 1000 rpm. By interchanging of the output shaft a clutch is simultaneously engaged and disengaged to drive the output shaft at the desired speed for the spline shaft which is extending from the power take-off assembly.

Accordingly, this invention provides an output shaft adapted for connection to implements and correlating the drive speed with the shaft connection by operating a cammed shaft which actuates clutch shifting elements to selectively engage the proper drive gear for driving the power take-off shaft. Selective and alternative positioning of the output shaft reciprocates the cammed shaft against the biasing force of a spring to selectively engage the proper gear speed for driving the power take-off shaft.

Accordingly, it is an object of this invention to provide a two-speed power take-off shaft.

It is another object of this invention to provide a two-speed power take-off output for selectively reciprocating a cammed shaft to shift a clutch collar for selectively engaging one of two driven gears to correlate the output speed with the proper spline connection.

It is a further object of this invention to provide a two-speed power take-off assembly with an output shaft to selectively reciprocate a cammed shaft to shift the power take-off to the selected speed.

It is a further object of this invention to provide a two-speed power take-off assembly on a tractor with a splined output shaft. The spline coupling is selectively coordinated to operate with the selected speed by positioning the output shaft in the power take-off assembly to bias a cammed shaft to engage a clutch collar for shafting the power take-off assembly into the desired speed ratio.

The objects of this invention are accomplished by providing a two-speed power take-off assembly on a tractor with a splined output shaft adapted for operating at two drive speeds and fitted with splined couplings correlated with the output speed of the power take-off assembly. An interchangeable output shaft selectively reciprocates a cammed shaft which has cammed surfaces engaging clutch shifting elements biasing the elements radially to axially move a clutch collar for selective engagement of the high or low speed drive gears in the power take-off assembly.

Referring to the drawings,

FIG. 1 illustrates a cross section view of the power take-off assembly with the clutch engaged.

FIG. 2 illustrates a cross section view of a portion of the power take-off assembly showing the clutch shifted to another position.

Figure 5:
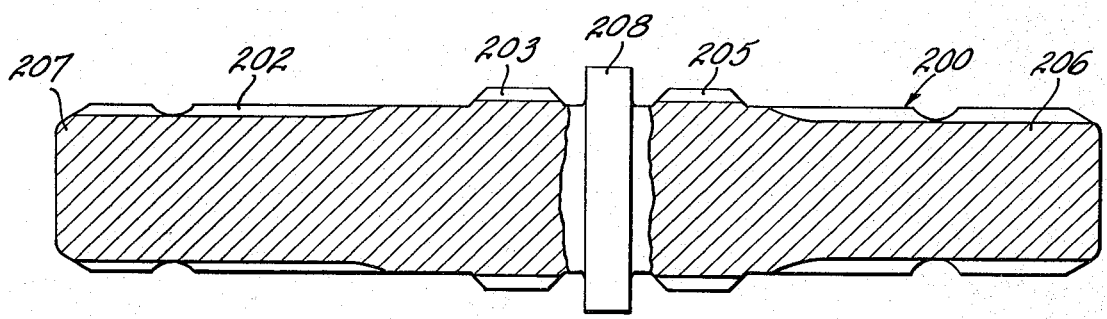
FIG. 5 is a partial cross section view of a reversible output shaft for use in the power take-off assembly.

The preferred embodiment of this invention is illustrated in the attached drawings. The engine 1 drives through the engine clutch 2 to drive the drive shaft 3. The drive shaft 3 is rotatably mounted in the bearing assemblies 4 and 5 which are mounted in the housing 6. The drive gear 7 of the gearset 8 drive the driven gear 9. The driven gear 9 is fixed to the shaft 10 through the spline 11. The shaft 10 is rotatably supported in the bearing assembly 12 mounted in the housing 6. The shaft 10 is also rotatably mounted in the bearing assembly 13 and is fastened to the cluster gear 14 which forms a clutch hub 15. Cluster gear 14 is rotatably mounted on the shaft 10 and includes the gears 17 and 18 which in turn drive the gears 19 and 20, respectively. The clutch drum 21 is connected by a spline 22 to the shaft 10 and carries the clutch disks 23. The clutch disks 24 frictionally engage the disks 23 when the hydraulic actuator 24 is pressurized. When the clutch 16 is engaged, the cluster gear 14 drives gears 19 and 20 to drive the power take-off assembly.

A quill shaft 26 is rotatably mounted in the bearing assemblies 27 and 28 which are supported in the housing 6. The gears 19 and 20 are carried on the splined bushings 29 and 30 which are rotatably mounted on the quill shaft 26. The bushing 29 is connected to gear 19 through the spline 31 while the gear 20 is connected through the spline 32 to the bushing 30. The snap rings 132 and 33 hold the gears in adjoining rotational position with each other. The bearing assemblies 27 and 28 each abut a spacer 34 and 35, respectively, to hold the snap rings 33 and 32 in engagement with the side of the gears 20 and 19. The bearing 27 is retained by the snap rings 36 and 37 while the bearing 28 is held by the snap rings 38 and 39. This in turn holds the assembly axially aligned on the quill shaft 26.

Reciprocally mounted within the quill shaft 26 is a cammed shaft 40 with the left-hand end engaging a spring 41 which is seated on the spring retainer 42. The cammed shaft is normally biased to the right-hand-position for engaging the plunger 43.

The cammed shaft 40 is formed with annular recesses 44 and 45. The annular recess 44 is defined by a stepped down cylindrical surface 46 joining the conical sidewalls 47 and 48 which extend to the full diammetrical land 149. Similarly, the annular recess 45 is formed with the stepped down diammetrical surface 50 with adjoining conical sidewalls 51 and 52. The annular recess 44 normally receives the spherical elements 54 as shown. The annular recess 45 normally receives the spherical elements 55 as shown.

FIG. 1 shows the cammed shaft 40 with the stem 56 engaging the end of the plunger 43. The snap ring 57 retains the cam shaft 40 within the quill shaft 26.

The plunger 43 is welded to the sleeve 58 to form an integral structure. The sleeve 58 forms a spline 59 engaging the mating spline on the quill shaft 26 permitting the sleeve 58 to slide axially relative to the quill shaft 26. A plunger 43 which is integral with the sleeve 58 slides axially within the hollow shaft 159 as an interchangeable output shaft 60 is positioned in the hollow shaft 159. The seal 61 in the annular recess of a disc 161 provides an external seal for the power take-off assembly.

The hollow shaft 159 is rotatably mounted in the bearing assemblies 62 and 63. The bearing assemblies 62 and 63 are held in position by a spacer 164 and by the snap ring 64 on the housing 6 and also held in position on the hollow shaft 159 by the locking washer 65 and nut 66. The seal 67 provides an external sealing for the bearing assemblies 62 and 63.

An interchangeable output shaft 160 is shown in FIG. 2 for a high speed operation in which the gearset 70 is driving the power take-off assembly. The spline 71 is a 21-toothed spline for driving the implement at the normal 1000 rpm speed.

When the shaft 60 is interchanged, as shown in FIG. 1, the low speed gearset 74 is in operation. The 6 spline 75 is then extending from the power take-off assembly for driving the implement at the normal 150 rpm.

Figure 3:
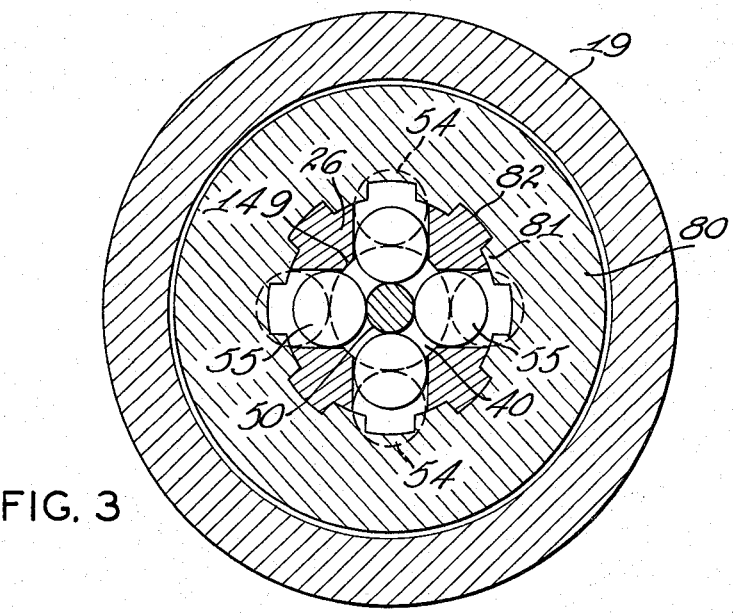
FIG. 3 is a cross section view taken on line III—III of FIG. 1.

FIG. 3 shows a cross section view of the gear 19 receiving the clutch collar 80. The clutch collar 80 is formed with an internal spline 81 engaging the external spline 82 of the quill shaft 26. The quill shaft 26 receives the cammed shaft 40 which reciprocates within the quill shaft 26. A reduced diameter 50 of the cammed shaft 40 is shown with the spherical elements 55 engaging the reduced diameter 50. The conical surface 51 is shown behind the spherical elements 55.

Figure 4:
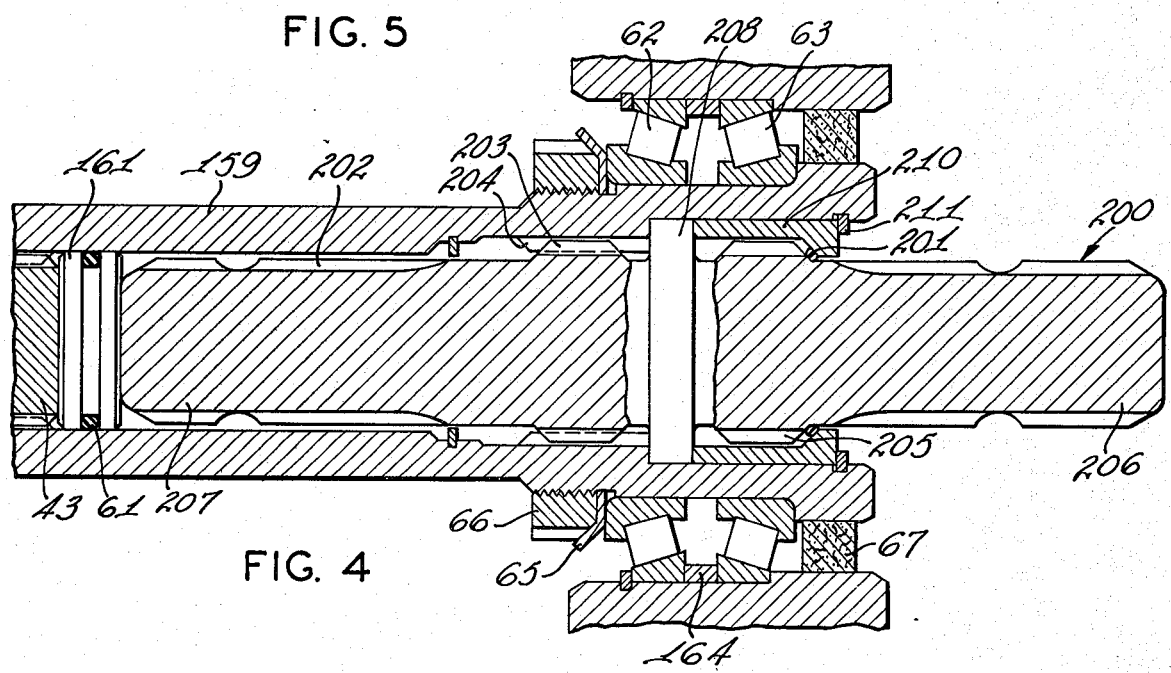
FIG. 4 is a cross section view showing a reversible output shaft in the power take-off assembly.

FIGS. 1 and 2 show interchangeable output shafts 60 or 160. Whether the output shaft be interchangeable or reversible is optional. FIGS. 4 and 5 show the use of a reversible output shaft 200 with the conventional 21-toothed spline 206 on the right-hand end and the conventional 6-toothed spline 207 on the left-hand end. The aligning flange 208 is formed in the center portion of the output shaft. The shaft is formed with a drive spline 203 on the left-hand side of the flange and a drive spline 205 on the right-hand side of the flange. The splines 203 or 205 engage the internal spline 204 of the quill shaft 159.

Referring to FIG. 4, the sleeve 210 retains the output shaft 200 and seal 201 position when the snap ring 211 is received in the annular recess of the quill shaft 159. It is noted that the 6-toothed spline end is the longer end and when positioned as shown in FIG. 4, biases the cammed shaft 50 to engage the highspeed gearset 70. The operation with the interchangeable output shafts 60 or 160 or the reversible output shaft 200 is essentially the same once they are assembled.

The operation of the device will be described in the following paragraphs.

The engine 1 drives through the engine clutch 2 to drive the drive shaft 3 which in turn drives the countershaft 10. The countershaft 10 is connected through the spline 22 to the clutch drum 21. When the clutch 16 is engaged, the clutch drum drives the cluster gear 17 which in turn is in engagement with the gearsets 70 and 74. The drivegears 19 and 20 of the gearsets 74 and 70 are continuously driven when the clutches 2 and 16 are in engagement.

The clutch teeth on the ends of the clutch collar 80 are either engaged with the sleeves 29 and 30 to drive the gears 19 or 20. The clutch collar passes through a neutral position for selective and alternative engagement of the gears 19 and 20. FIG. 2 shows the high speed gear 20 in engagement through the clutch collar 80 engaging the bushing 30. Accordingly, the drive is transmitted through the gear 20, bushing 30 and clutch collar 80, quill shaft 26 and through the sleeve 58 of plunger 40 to the hollow shaft 159 and the reversible output shaft 60. When the output shaft 160 is used, the spring 41 biases the cammed shaft 40 to the position shown in FIG. 2 with the concial cam surface 51 biasing the spherical elements 55 for engagement of the clutch collar 80 with the bushing 30. With the clutch 80 splined to the quill shaft 26, the drive for the power take-off assembly is in engagement for driving through the high speed range.

To engage the low speed driving range, the output shaft 60 is interchanged for shaft 160. The snap ring 90 is removed from the hollow shaft 159 and the output shaft 160 is replaced by output shaft 60 and positioned as shown in FIG. 1. The snap ring is again replaced in the annular recess internally of the hollow shaft 159. The longer end 91 of the output shaft 60 biases the plunger 43 inwardly which in turn carries the cammed shaft 40 against biasing force of the spring 41 which forces the spherical elements 54 radially outward and shifts the clutch collar 80 to the right-hand position. This in turn engages the bushing 29 and the drive from gear 19 for drive through the clutch collar 80 to the quill shaft 26, sleeve 58 of plunger 43 and the hollow shaft 159 to the output shaft 60. Normally the clutch collar is engaging gear 19 or 20 since the interchangeable output shafts 60 and 160 either biases the clutch collar to the left-hand position to engage gear 19 or the spring 41 biases the clutch collar to the right-hand position for engaging the gear 20. The spherical elements 54, 55 are engaged by the cammed shaft 40 to provide the axial movement of the clutch collar 80 to provide clutch engagement. The surface 149 forms a locking surface to hold spherical elements 54 or 55 in position to maintain either gear 19 or 20 in the locked position.

The embodiments of the invention in which an exclusive property or privilege is claimed are defined as follows:

1. A two-speed power take-off assembly comprising, a first and a second drive gear rotating on a common axis and driven at a high and low speed respectively, clutch teeth defined by each of said gears, a clutch collar slidably mounted for reciprocating on said common axis defining cammed surfaces, mating clutch teeth defined by said clutch collar for selectively engaging the clutch teeth on said gears, a cammed shaft rotatably and slidably mounted on said common axis and defining first and second cammed surfaces, first and second sets of clutch shifting elements mounted between and engaging said cammed surfaces on said cammed shaft and said cammed surfaces on said clutch collar, resilient means biasing said cammed shaft in one direction, an output shaft selectively biasing said cammed shaft against the force of said resilient means to selected positions for selectively and alternatively clutching of said first and second gears, said cammed surface on said cammed shaft selectively biasing said first and second sets of clutch shifting elements radially to reciprocate and clutch said clutch collar in selective engagement with each of said gears.

2. A two-speed power take-off assembly as set forth in claim 1 wherein said resilient means includes a spring normally biasing said cammed shaft against said output shaft for positioning said clutch collar in engagement with one of said gears.

3. A two-speed power take-off assembly as set forth in claim 1 including means defining a stepped diameter on said cammed shaft, said cammed surfaces defining conical surfaces adjoining a minor diameter and a major diameter of said cammed shaft to form cammed surfaces biasing said clutch shifting elements for shifting said clutch collar.

4. a two-speed power take-off assembly as set forth in claim 1 wherein said clutch shifting elements define spherical elements for shifting said clutch collar.

5. A two-speed power take-off assembly as set forth in claim 1 wherein said output shaft selectively defines one of two dissimilar splines on the end of said output shaft adapted for connection to an implement coordinated for operation at the engaged output speed of said power take-off assembly.

6. A two-speed power take-off assembly as set forth in claim 1 wherein each of said gears defines a gear hub having clutching teeth, clutching teeth on said clutch collar for selectively engaging the clutching teeth of the hub of said first or second gear.

7. A two-speed power take-off assembly as set forth in claim 1 wherein said clutch collar defines a cammed surface for selectively engaging said clutch shifting elements for selectively biasing said clutch collar in either one of two selected directions for engaging either one of said two gears.

8. A two-speed power take-off assembly as set forth in claim 1 wherein said cammed shaft defines locking surfaces for locking said clutch in the engaged position.

9. A two-speed power take-off assembly as set forth in claim 1 including a sleeve receiving said cammed shaft, radial openings receiving said clutch shifting elements for confining the movement of said elements in a radial direction upon engagement with the cammed surfaces of said cammed shaft for shifting said clutch.

10. A two-speed power take-off assembly as set forth in claim 1 including a sleeve receiving said cammed shaft defining radial openings for receiving said clutch shifting elements, said cammed surfaces on said cammed shaft selectively engaging said clutch shifting elements for biasing said elements radially to selectively engage said clutch collar, means on said clutch collar defining conical surfaces selectively engaging said clutch shifting elements biasing said clutch collar axially for selective engagement of said first and second gear when said power take-off output shaft is selectively positioned in said power take-off assembly.

11. The two-speed power take-off assembly as set forth in claim 1 wherein said shaft defines a reversible shaft.

12. A two-speed power take-off assembly as set forth in claim 1 wherein said output shaft defines an interchangeable high speed or low speed output shaft.

* * * * *